(12) United States Patent
Mittal et al.

(10) Patent No.: US 9,712,455 B1
(45) Date of Patent: Jul. 18, 2017

(54) DETERMINING AVAILABILITY OF NETWORKING RESOURCES PRIOR TO MIGRATION OF A SERVER OR DOMAIN

(71) Applicant: Cisco Technology, Inc., San Jose, CA (US)

(72) Inventors: Shailesh Mittal, Santa Clara, CA (US); Raghu Krishnamurthy, Santa Clara, CA (US); Nir Frenkel, San Jose, CA (US); Jay Weinstein, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 274 days.

(21) Appl. No.: 14/598,368

(22) Filed: Jan. 16, 2015

Related U.S. Application Data (60) Provisional application No. 62/079,324, filed on Nov. 13, 2014.

(51) Int. Cl.
  *G06F 15/16* (2006.01)
  *H04L 12/923* (2013.01)
  *H04L 29/08* (2006.01)

(52) U.S. Cl.
  CPC ............ *H04L 47/762* (2013.01); *H04L 67/10* (2013.01)

(58) Field of Classification Search
  CPC ...... G06F 9/45558; G06F 9/4856; G06F 9/50; G06F 8/60; G06F 9/5077; G06F 9/44; G06F 9/455; H04L 47/762; H04L 67/10
  See application file for complete search history.

(56) References Cited

U.S. PATENT DOCUMENTS

| 6,735,691 | B1 | 5/2004 | Capps et al. |
| 7,379,994 | B2* | 5/2008 | Collazo ............... H04L 41/0233 702/182 |
| 7,779,345 | B2 | 8/2010 | Topalov et al. |
| 8,452,862 | B2 | 5/2013 | Neuse et al. |
| 8,730,980 | B2 | 5/2014 | Bagepalli et al. |
| 8,761,762 | B2 | 6/2014 | Moermans |
| 2010/0186019 | A1* | 7/2010 | Branson ................. G06F 9/5011 718/104 |
| 2011/0016468 | A1* | 1/2011 | Singh ................... G06F 9/45558 718/1 |
| 2011/0099262 | A1* | 4/2011 | Wang ...................... H04L 12/56 709/223 |
| 2011/0202571 | A1* | 8/2011 | Yan ........................ H04L 45/745 707/797 |
| 2011/0246669 | A1 | 10/2011 | Kanada et al. |

(Continued)

FOREIGN PATENT DOCUMENTS

| EP | 2423813 A2 | 2/2012 |
| EP | 2765754 A2 | 8/2014 |

*Primary Examiner* — Ario Etienne
*Assistant Examiner* — Kidest Mendaye
(74) *Attorney, Agent, or Firm* — Edell, Shapiro & Finnan, LLC (57) ABSTRACT

Presented herein are techniques for resolving VxAN (VSANs and VLANs) networking connectivity, prior to server or domain migration. When UCS domains receive a workload or service profile from a UCS Central Controller, required VLANs/VSANs are checked for deployment for that UCS domain in Fabric Interconnects, and once VLANs/VSANs are successfully confirmed, the workload is deployed into one of the compute servers in that domain.

20 Claims, 12 Drawing Sheets (56) References Cited

U.S. PATENT DOCUMENTS

| | | | |
|---|---|---|---|
| 2012/0131662 A1* | 5/2012 | Kuik | G06F 9/45558 726/11 |
| 2013/0125112 A1 | 5/2013 | Mittal et al. | |
| 2013/0212200 A1 | 8/2013 | Dennis et al. | |
| 2013/0227095 A1* | 8/2013 | Nichele | H04L 41/082 709/221 |
| 2013/0339947 A1* | 12/2013 | Neary | G06F 9/45558 718/1 |
| 2014/0229944 A1* | 8/2014 | Wang | G06F 9/5088 718/1 |
| 2015/0088586 A1* | 3/2015 | Pavlas | G06F 9/45558 705/7.25 |
| 2015/0096011 A1* | 4/2015 | Watt | H04L 63/0272 726/15 |

* cited by examiner

DETERMINING AVAILABILITY OF NETWORKING RESOURCES PRIOR TO MIGRATION OF A SERVER OR DOMAIN

CROSS-REFERENCE TO RELATED APPLICATION

This application claims priority to U.S. Provisional Application No. 62/079,324, filed Nov. 13, 2014, the entirety of which is incorporated herein by reference.

TECHNICAL FIELD

The present disclosure relates generally to server migrations and domain migrations to a different physical location.

BACKGROUND

With Unified Communication System (UCS) Data Centers becoming larger, it is increasingly common for workloads to be defined using cloud-based management systems. For example, a typical workload may include compute profiles, storage profiles and networking profiles, etc. Further, global workloads may be configured to be dynamic in nature, such that these workloads may be migrated from one compute element/device in a first domain to another compute element in another domain.

As part of a networking profile, a workload may have interfaces defined, for example, for Ethernet (e.g., network interface cards (NICs) and Fiber Channel (HBAs)) interfaces, along with virtual local area network (VLAN) and virtual storage area network (VSAN) configurations for the host. Before a workload may be deployed on a particular compute element, VLANs/VSANs are generally configured on Fabric-Interconnects (FIs), so that traffic originating from the deployed workloads can be tagged and routed appropriately through the FI ports.

DESCRIPTION OF EXAMPLE EMBODIMENTS

Overview

Presented herein are techniques for resolving requested networking resources prior to server or domain migration. At a controller, a request to migrate a server or a domain from a first location associated with a first node to a second location associated with a second node is received, with the first node and the second node included in a tree hierarchy of multiple nodes corresponding to networking domain groups. One or more service profiles associated with the server or the domain is retrieved, each service profile specifying a specific set of networking resources for the server or the domain. Prior to migration of the server or the domain to the second location, it is determined whether the networking resources associated with the service profile of the server or the domain are available at the second node, and in response to determining that the networking resources are available at the second node, the migration of the server or the domain to the second location is performed.

Example Embodiments

Figure 1:
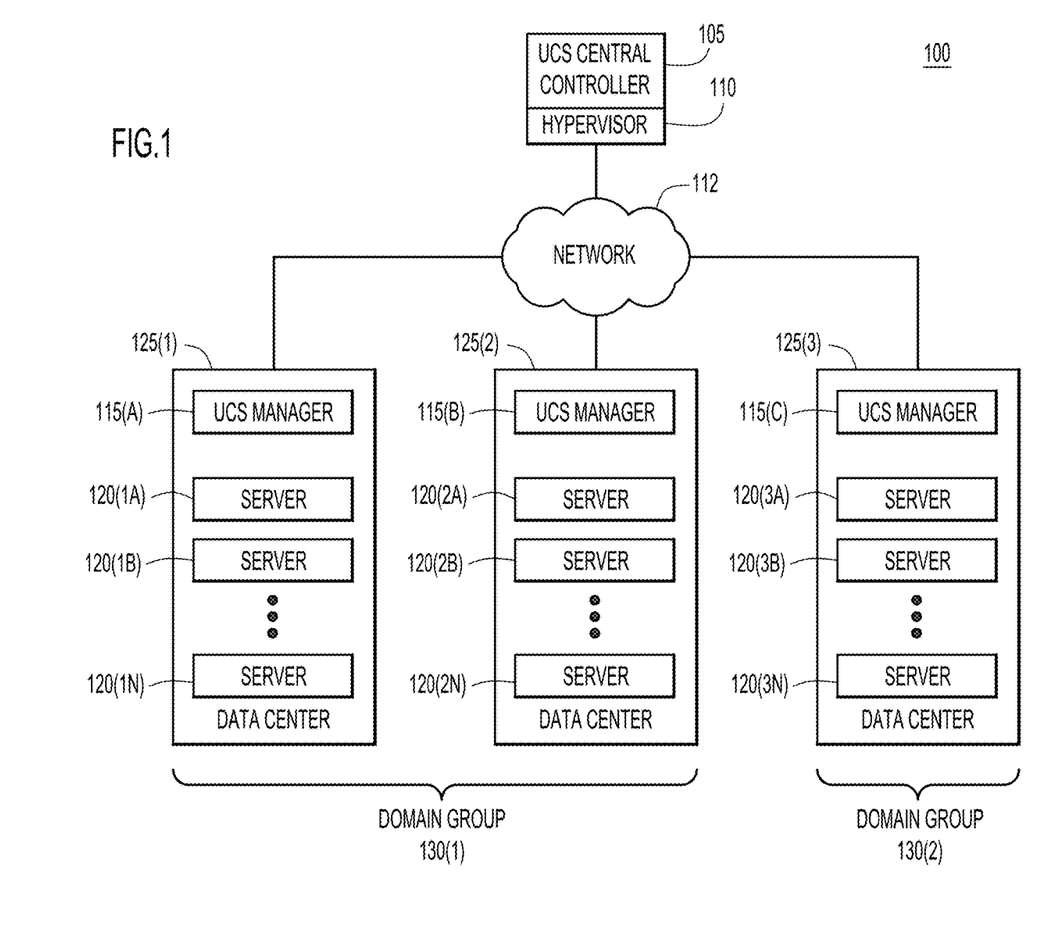
FIG. 1 shows a computing environment according to an example embodiment.

Referring first to FIG. 1, a block diagram of a computing environment 100 is shown that includes a UCS central controller 105, a hypervisor 110, a network 112, and one or more datacenters, e.g., datacenters 125(1)-125(3). Each datacenter may include a UCS manager and a plurality of servers managed by the UCS manager. For example, datacenter 125(1) may include UCS manager 115(A), which manages servers 120(1A)-120(1N); datacenter 125(2) may include UCS manager 115(B), which manages servers 120(2A)-120(2N); and datacenter 125(3) may include UCS manager 115(C), which manages servers 120(3A)-120(3N). Although the example computing environment of FIG. 1 shows three datacenters, the techniques presented herein may be applied to any number of datacenters. Each datacenter may correspond to a unique geographical location, or alternatively, multiple datacenters may be grouped together in a single geographical location.

Each datacenter or each server in a datacenter may be assigned or grouped into a particular domain group. Accordingly, servers or other components of different data centers may reside within the same domain group. In this example, datacenters 125(1) and 125(2) are grouped into Domain Group 130(1) and datacenter 125(3) is grouped into another domain group 130(2). In some aspects, the logical grouping of servers of datacenters into a domain group may be assigned arbitrarily, and is not tied to a particular geographical location. Thus, a domain group is an arbitrary grouping of UCS domains that can be used to group systems into geographical or organizational groups. In some aspects, each domain group may comprise one or more levels of domain subgroups, with each subgroup having a hierarchical relationship with the respective parent domain group. UCS central controller 105 may interface with one or more UCS managers via hypervisor 110.

Network 112 may include a local area network (LAN), wide area network (WAN), e.g., the Internet, and thus can include a wireless, wired, or hybrid network that is capable of forwarding/routing communications between UCS central controller 105 and one or more UCS managers 115(A)-115(C).

UCS central controller 105 may manage multiple UCS managers, e.g., UCS managers 115(A)-115(C), allowing a single management point for the UCS environment. The UCS central controller 105 may manage multiple UCS managers, and potentially thousands of servers. For example, a service profile may be defined at UCS central controller 105 and deployed to one or more datacenters 125(1)-125(3). The service profile is received at a UCS manager, which then deploys the service profile to the desired endpoint(s)/server(s). In this example, a service profile defined at UCS central controller 105 may be deployed to any of UCS managers 115(A)-115(C). Once received at a UCS manager, e.g., UCS manager 115(A), the service profile may be deployed to one or more servers, e.g., servers 120(1A)-120(1N).

Accordingly, UCS central controller 105 may act as a policy manager for servers across multiple domain groups and geographic locations. UCS central controller 105 may integrate UCS components across multiple UCS domains as well as manage servers (also referred to as server blades), virtual machines (VMs), and storage and networking resources—across multiple chassis—as a single logical domain.

A service profile defined at UCS central controller 105 may be applied e.g., to a blade server or rack server, e.g., any of servers 120(1A)-120(1N), 120(2A)-120(2N), and 120(3A)-120(3N). A service profile defines a computing element and its associated local area network (LAN) and storage area network (SAN) network connectivity, e.g., storage and networking characteristics. Service profiles may be stored in Fabric Interconnects (FIs), e.g., a Fabric Interconnect may be hardware comprising a UCS Manager. When a service profile is deployed to a server, a UCS manager automatically configures the server, adapters, fabric extenders, and fabric interconnects (FIs) based upon the configuration specified in the service profile, thereby reducing manual configuration for servers, network interface cards (NICs), and LAN and SAN switches, etc.

A service profile may include one or more of the following types of information: server definition, identity information, firmware revision specifications, connectivity definitions, etc. A server definition may include, e.g., a specific server or a blade inserted into a specific chassis to which the profile is applied. Identity information may include one or more of a Universally Unique Identifier (UUID), Media Access Control (MAC) address for each virtual NIC (vNIC), and World Wide Name (WWN) specifications for each Host Bus Adaptor (HBA). Firmware revision specifications, which are optional, may include information regarding firmware updates. Connectivity definitions may include information used to configure network adapters, fabric extenders, and parent interconnects, etc.

Based on the techniques presented herein, before workloads are moved to another compute server, which may be on a different physical domain associated with a different geographical or physical location, domain environment validation from the perspective of networking and storage resources may be performed at the source, e.g., the current compute server. For a workload to remain available after the migration, necessary networking and storage configurations, e.g., VLANs, VSANs, soft/hard pinning configurations, QoS configurations, etc., need to be established successfully, before the migration commences.

Presented herein are techniques to ensure that network and storage configurations of target domain environments, e.g., switch/FI configurations for ports, pinning and VLAN/VSAN configurations, etc. are automatically configured before a workload is deployed into the compute servers of a target domain. According to the techniques presented herein, VxAN (VSANs and VLANs) networking connectivity is resolved prior to server or domain migration. VxAN is a term used to represent both VSAN and VLAN networking resources. When a UCS domain receives a workload or service profile from UCS central controller 105, FIs of that UCS domain are checked for required VLANs/VSANs prior to migration and deployment. Once VLANs/VSANs are successfully confirmed, the workload (e.g., service profile) is deployed into one of the compute servers in that target UCS domain. Such techniques help ensure that workloads are configured in a manner compatible with network/storage environments, significantly improving the success of migrations.

Figure 2A:
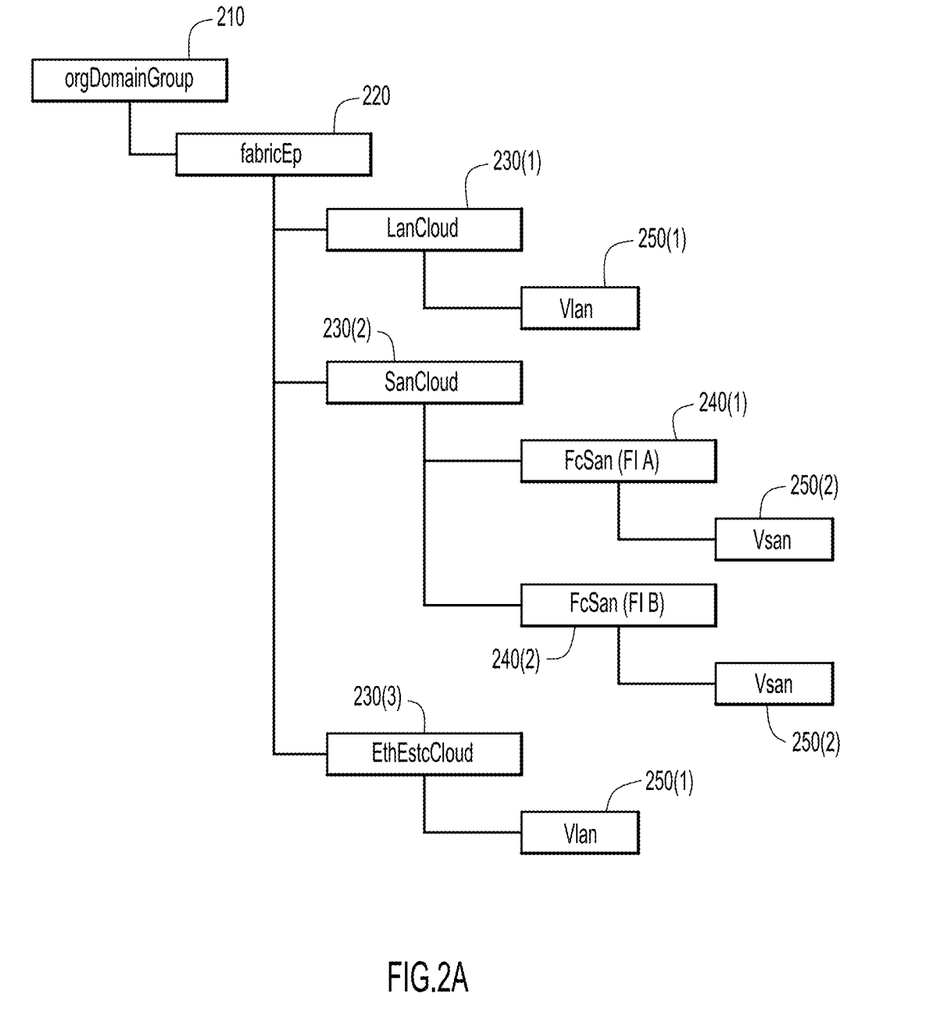
FIGS. 2A and 2B show various organizational hierarchies according to an example embodiment.
Figure 2B:
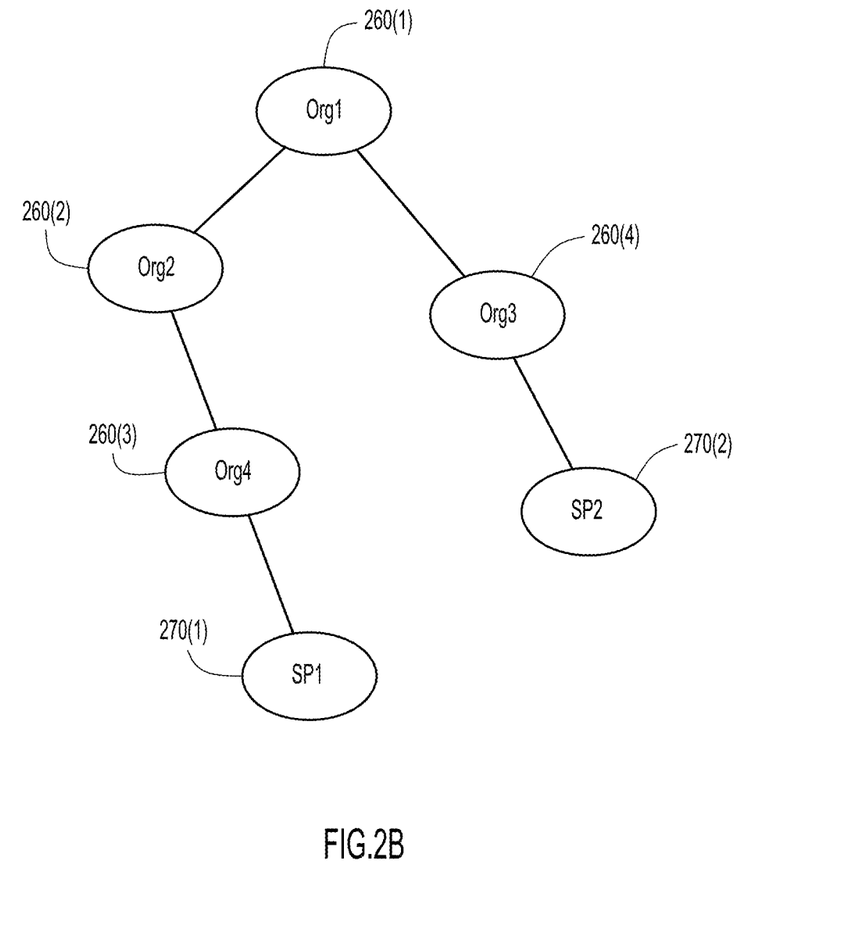

Reference is now made to FIGS. 2A and 2B. FIG. 2A shows an example of a node of a domain group in a domain group tree, and FIG. 2B shows an example of an organizational (org) hierarchy. A node of a domain group 210 may comprise a hierarchical structure of networking resources, including a fabric endpoint (fabricEp) 220, various types of cloud-based storage, e.g., a LanCloud 230(1), a SanCloud 230(2) and a Ethernet-based storage (EthEstcCloud) 230(3). SanCloud 230(2) may further comprise fiber interconnect storage FcSan (FI A) 240(1) and FcSan (FI B) 240(2). For each type of cloud-based storage, particular networking resources may be specified, e.g., VLAN networking resources 250(1) and VSAN networking resources 250(2). FIG. 2A shows an example of a single node in a domain group tree. It is understood that a plurality of nodes may be cascaded to create complex structures.

FIG. 2B shows an organizational hierarchy, wherein each organizational node 260(1)-260(4) may represent a logical containment across domains, e.g., a corporate department, etc. A service profile may be assigned to each organization node, e.g., service profile 1 "SP1" shown at reference numeral 270(1) may be assigned to Org4 260(3) and service profile 2 "SP2" shown at reference numeral 270(2) may be assigned to Org3 260(4).

Accordingly, a domain group 210, as shown in FIG. 2A, may be a logical containment that may hold different physical domains, e.g., domains in UCS Asia, UCS Europe, and UCS Australia. An org hierarchy or organizational hierarchy, as shown in FIG. 2B, may be a logical containment across domains, e.g., Quality Assurance, Finance, Development, Manufacturing, etc., and is not tied to a particular physical location.

Figure 3:
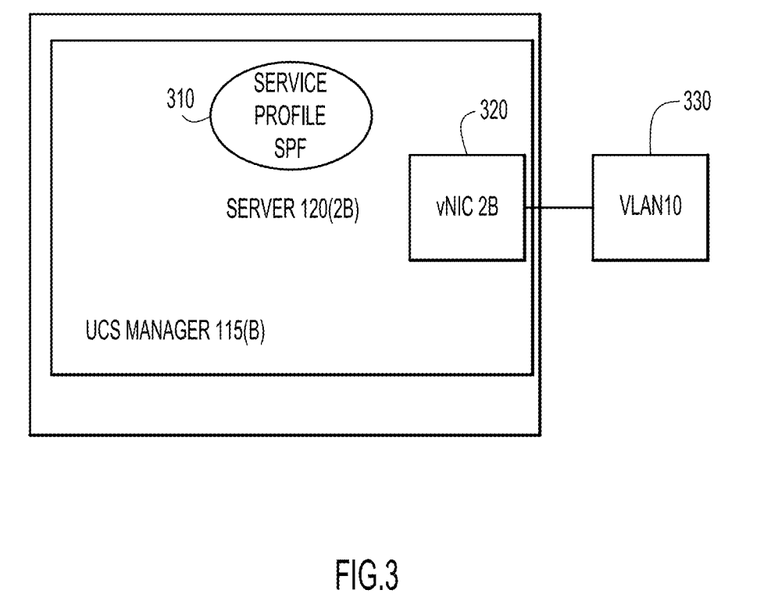
FIG. 3 shows a server communicating with a particular VLAN according to an example embodiment.

Referring to FIG. 3, an example is shown of a server of a domain group, and managed by a UCS manager, with a virtual network interface card (vNIC) communicating with a designated VLAN. In this example, UCS manager 115(B) may deploy a given service profile, e.g., service profile "SPF" 310, on a specific server, e.g., server 120(2B). Server 120(2B) may communicate with a specific VLAN, e.g., VLAN10 330, via a designated vNIC, e.g., vNIC 2B 320. The service profile may specify a particular vNIC to VLAN connectivity. Similarly, the service profile may specify a particular vNIC to VSAN connectivity.

According to the techniques disclosed herein, VxAN connectivity, as defined in UCS central controller, is resolved prior to server or domain migration to ensure that specified networking resources are available at the target migration site. For example, if service profile SPF 310 specifies VLAN10 330, UCS central controller 105 will confirm that VLAN10 330 is present at the target migration site before migration. Additionally, UCS central controller 105 will send this particular VLAN, e.g., the descriptors for VLAN10 330 or any other information associated with VLAN10 330, before the service profile 310 is sent to the UCS central controller 105. For example, if VLAN10 330 is not found on the target migration site, VLAN10 330 may be pushed to the target migration site. Once VLAN10 330 is successfully available on the target migration site, only then will the service profile SPF 310 be migrated to the target migration site.

Figure 4A:
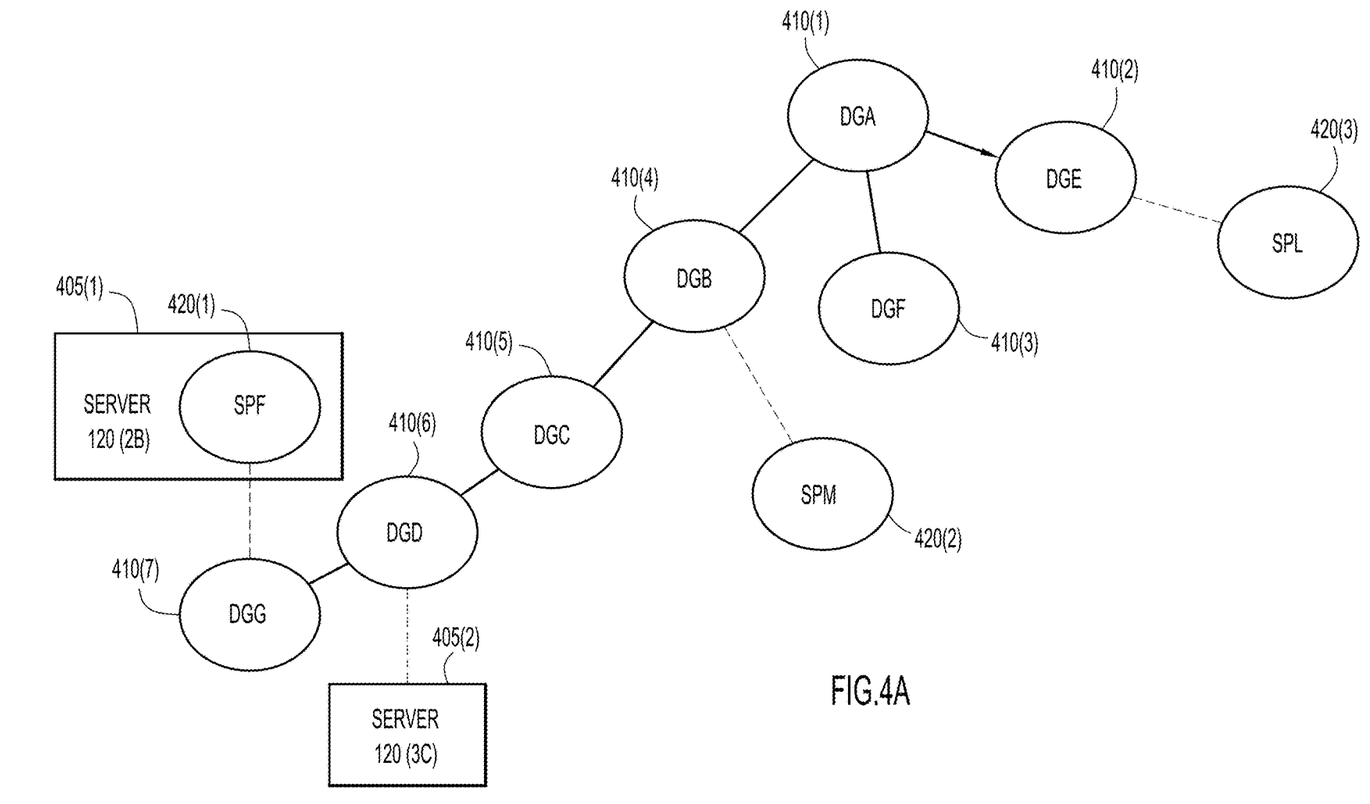
FIGS. 4A and 4B show a resource resolution prior to and after migration according to an example embodiment.
Figure 4B:
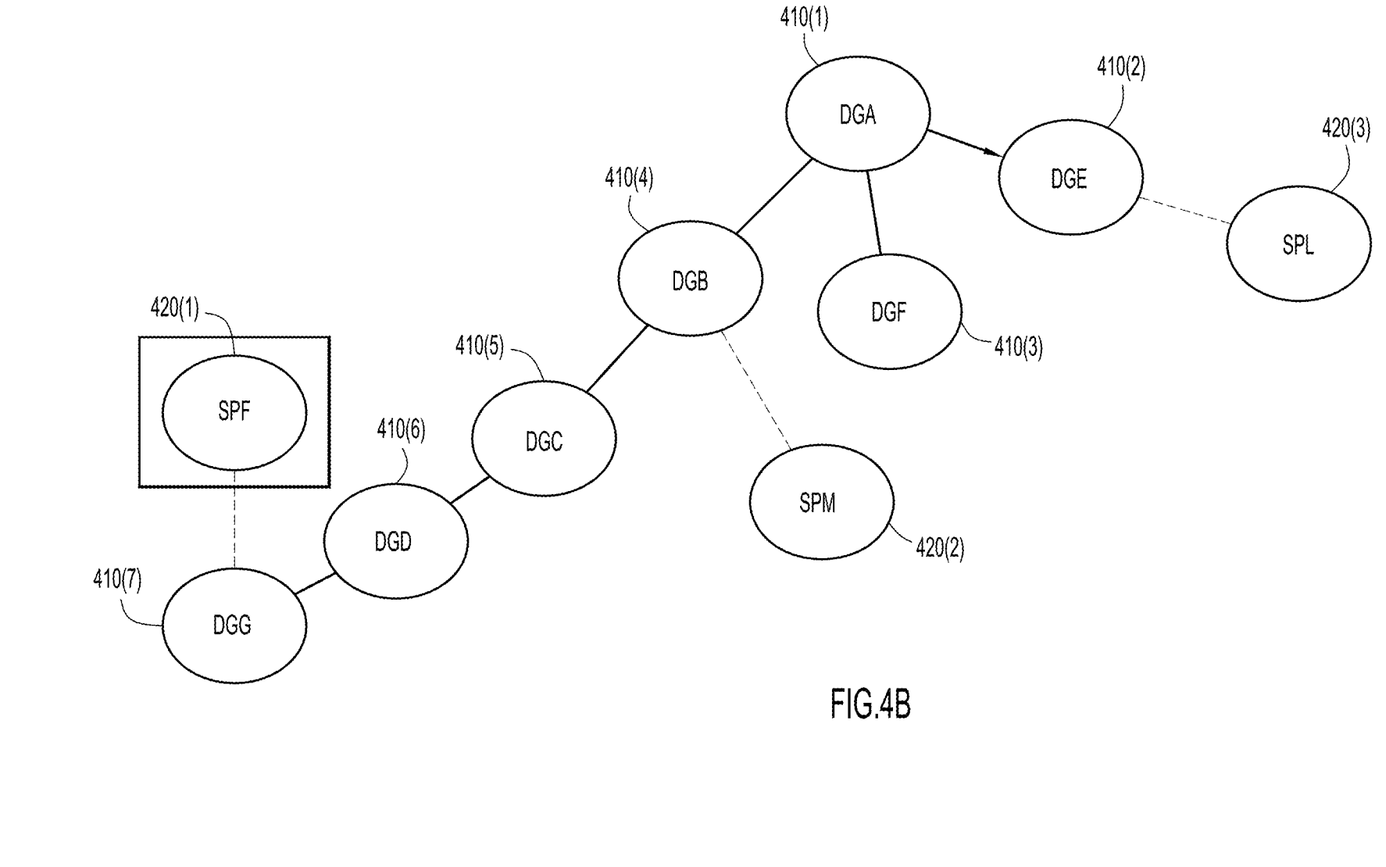

Referring now to FIGS. 4A and 4B, an example is shown of resource resolution prior to server or domain migration and after migration, in which a resource is controlled by the domain. It is understood that in some embodiments, the service profile may be assigned to an organizational node, e.g., 260(1)-260(4), as shown in FIG. 2B. In other embodiments, as shown in FIGS. 4A and 4B, a service profile may be shown as connected to a particular domain group, e.g., to indicate that a domain group includes a pointer to a specific service profile.

More specifically, with reference to FIG. 4A, various domain groups are shown in a hierarchical tree based structure, e.g., domain group nodes 410(1)-410(7) along with logical service profiles 420(1)-420(3). As an example, logical service profile "SPF" 420(1) is applied to domain DGG, which has associated computing resource Server 120(2B), shown at block 405(1). A request is made to migrate the workload to a different domain in a different physical location, e.g., domain group DGD 410(6) with associated computing resource Server 120(3C), shown at block 405(2). The UCS Central Controller 105 will determine whether the requested resource, e.g., VLAN10 330, according to the service profile is available in target domain DGD 410(6). If the resource is present, migration may proceed. If not, then the UCS central controller 105 will look for the resource at the next available node, e.g., moving up a domain-based tree hierarchy such as to DGC 410(5). In other embodiments, a migration request may include requests to move a domain from one branch to another branch of a domain tree hierarchy, e.g., DGD 410(6) to DGE 410(2), or may include moving a single service profile from one branch to another branch of a domain tree hierarchy, e.g., DGD 410(6) to DGF 410(3).

These techniques allow for creating segregation between different domains, allowing different paths of resolution to be established for each domain. Resolution typically begins at the bottom or in the middle of a domain group tree. In contrast, performing resolution by starting at the top of the tree may lead to all service profiles receiving the same resource, if the resource exists at the top.

An example of a migration request to move a server or domain, referred to as the current compute resource, to another domain will include information including a service profile corresponding to the current compute resource, the "from" and "to" source and destination domain groups, and the entity that is being migrated.

Referring to FIG. 4B, domain group DGD 410(6) was determined not to have all requested networking resources as determined by service profile SPF 420(1). Accordingly, the controller 105 evaluated domain group DGC 410(5), in which it was determined that all requested resources were present. Accordingly, the migration was permitted to occur. It is understood that the techniques disclosed herein may be applied to traverse any domain group tree in any manner, provided that requested networking resources are validated prior to migration.

Figure 5:
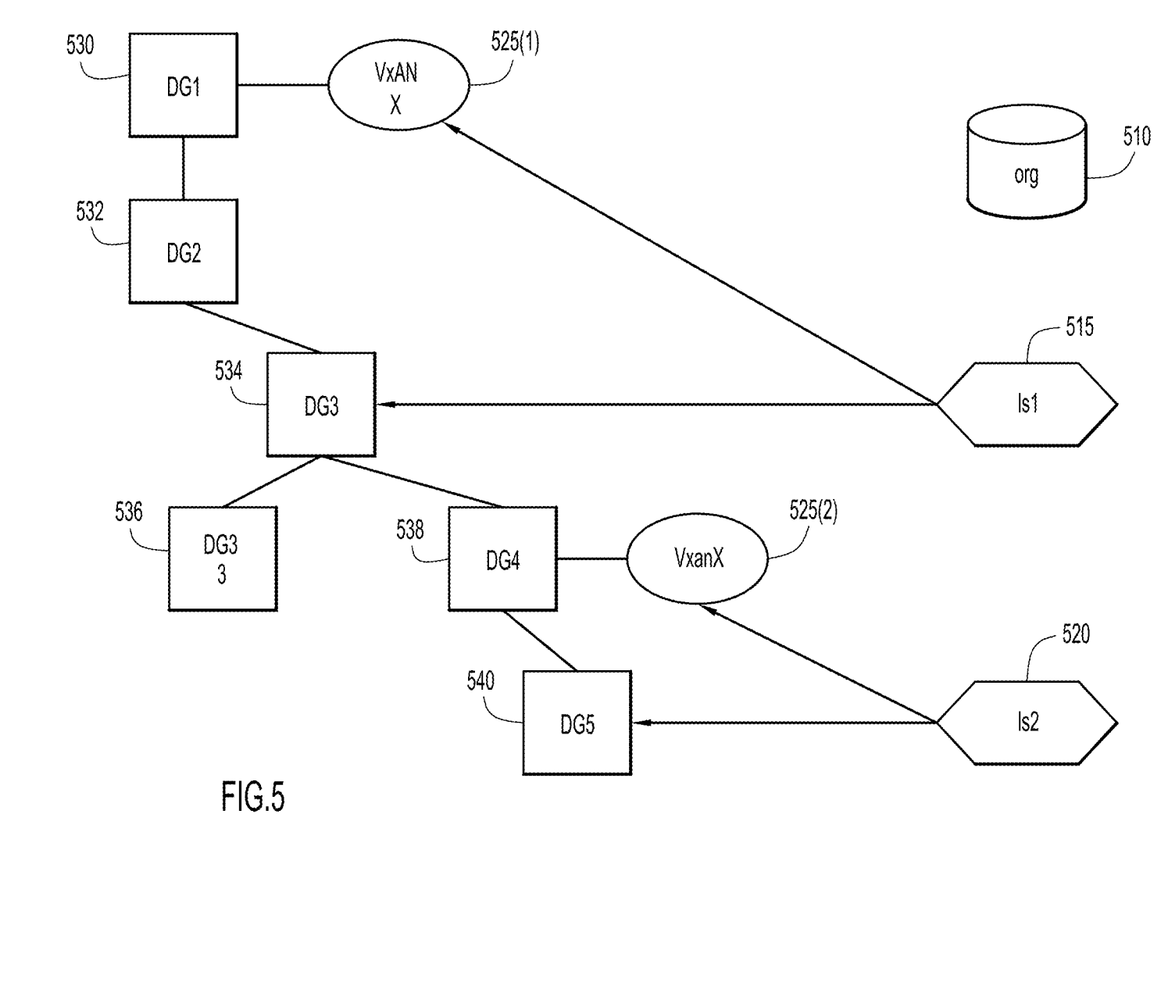
FIG. 5 shows centralized resource resolution according to an example embodiment.

Referring to FIG. 5, another example of VxAN resolution is provided. Individual service profiles 515, 520 are contained by an Organization 510, and access VxAN resources 525(1) and 525(2) from domain groups 530-540. Not all of the VxAN resources are available to the service profile, but instead, are filtered by assignment of VxAN resources to an Organization. For example, ls1 515 uses DG1/VxAN X resources, and ls2 520 uses DG1/DG2/DG3/DG4/VxAN X resources. Once VxAN resources are allowed to be accessed from Organization 510, service profiles ls1 and ls2 in that Organization 510 can access those VxAN resources.

Figure 6:
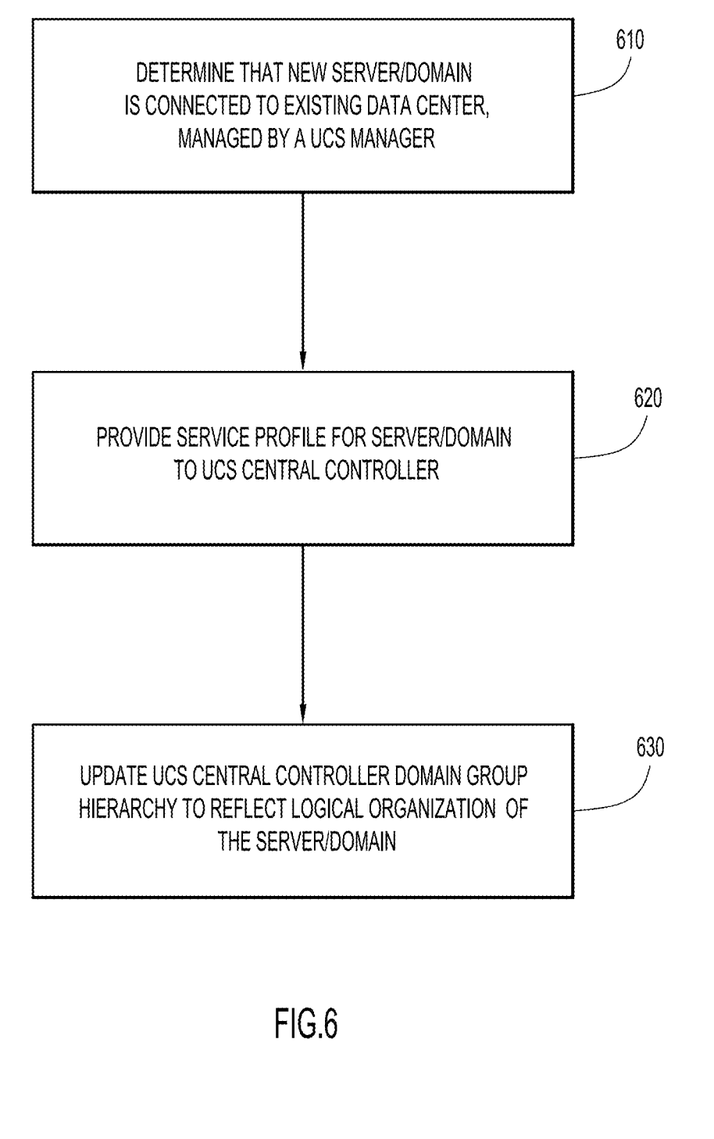
FIG. 6 shows a flowchart of operations performed prior to migration of a server or a domain according to an example embodiment.

Referring to FIG. 6, an example flowchart is provided that depicts a process for establishing servers and networks in a domain, prior to migration of a server or domain. It is understood that individual servers or entire domains may be migrated. At operation 610, UCS central controller 105 determines that a new server or domain is connected to an existing data center, e.g., managed by UCS manager 115(A), 115(B) or 115(C). The UCS manager is managed by UCS central controller 105. One or more service profiles are provided to the UCS manager from UCS central controller 105 for the individual server or for each relevant component of the domain. At operation 630, UCS central controller 105 domain group hierarchy is updated to reflect logical organization of the new server/domain. All global resources, e.g., global variables, etc., are provided to the UCS manager end point, before migration of a domain or server.

Figure 7A:
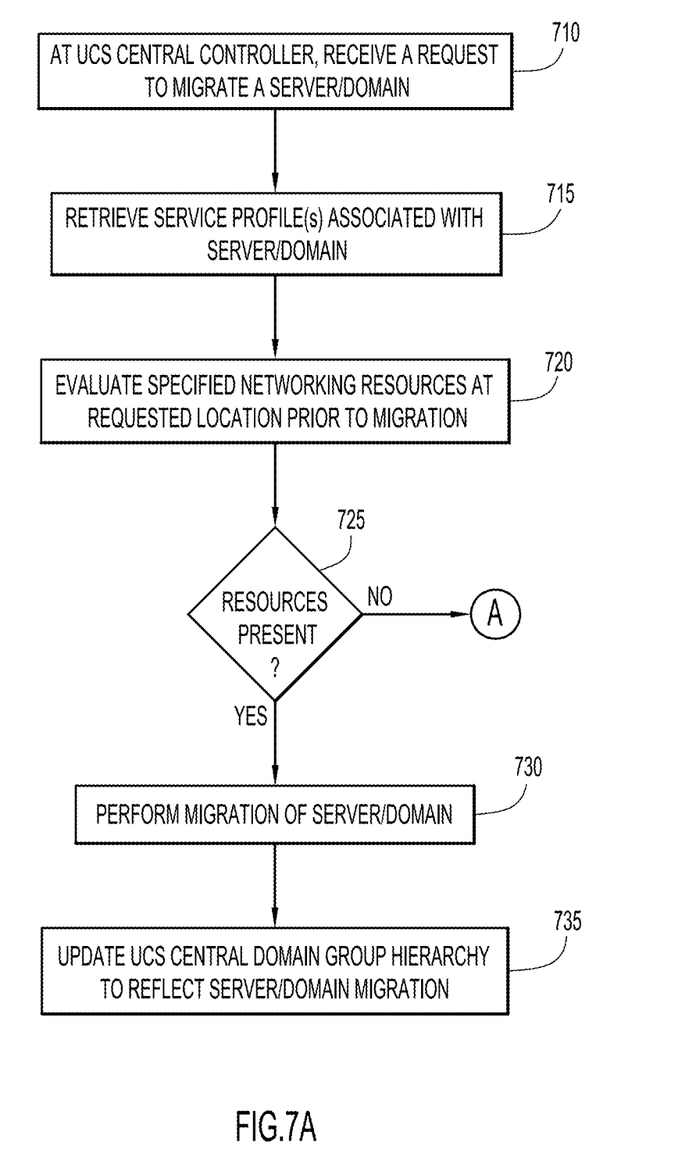
FIGS. 7A and 7B show flowcharts of operations performed for migration of a server or a domain according to an example embodiment.
Figure 7B:
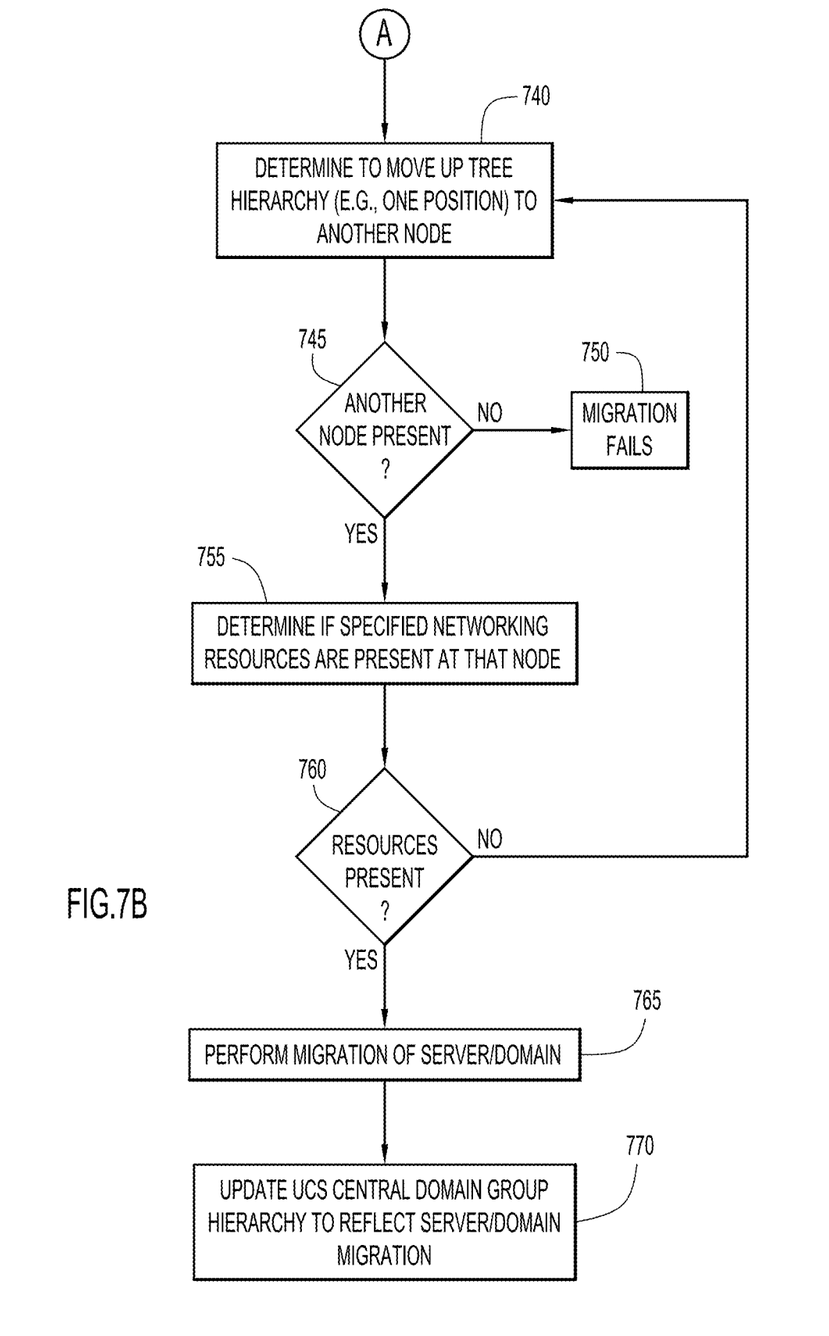

FIGS. 7A and 7B show a flowchart for migration of a server or a domain. At operation 710, UCS central controller 105 receives a request to migrate a server or a domain. At operation 715, one or more service profile(s) are retrieved for the server or servers in the domain group to be migrated. At operation 720, UCS central controller 105 determines if the requested networking resources are available at the requested target location, prior to migration. At operation 725, if the resources are determined to be available, then migration of the server/domain may proceed at operation 730. If the resources are not available at the requested target location, then the process continues at "A" in FIG. 7B. At operation 735, UCS central controller 105 domain group hierarchy may be updated to reflect server/domain migration. It is understood that these techniques are especially advantageous when migration is occurring to a different location. If migration is to a different server on the same domain, the resources are likely present, and the migration is essentially changing a physical blade on the same UCS domain.

Referring to FIG. 7B, in the event that resources are not available at the requested location, UCS central controller 105 may determine to move up the hierarchy, e.g., to the next available node of a tree-based hierarchy, as shown at operation 740. At operation 745, if another node is not present, the migration fails at operation 750. Otherwise, UCS central controller moves up the tree hierarchy to another node, and at operation 755, determines if the specified networking resources are present at that node. At operation 760, if the resources are present, migration of the server/domain may proceed at operation 765. It is noted that all global resources, e.g., global variables, etc., are provided to the UCS manager end point, before migration of a domain or server. At operation 770, UCS central controller domain group hierarchy is updated to reflect server/domain migration. Otherwise, if at operation 760, the requested resources are not present, the UCS central controller 105 may determine to move up the hierarchy to another node or next available node "higher" in the tree hierarchy. If available resources are determined not to be available, the migration is prevented and a fault is raised, and the user may manually create or configure the resource prior to performing the migration. Requested resources may include network and storage configurations of target domain environments, e.g., switch/FI configurations for ports, pinning and VLAN/VSAN configurations, etc. as disclosed herein.

Figure 8:
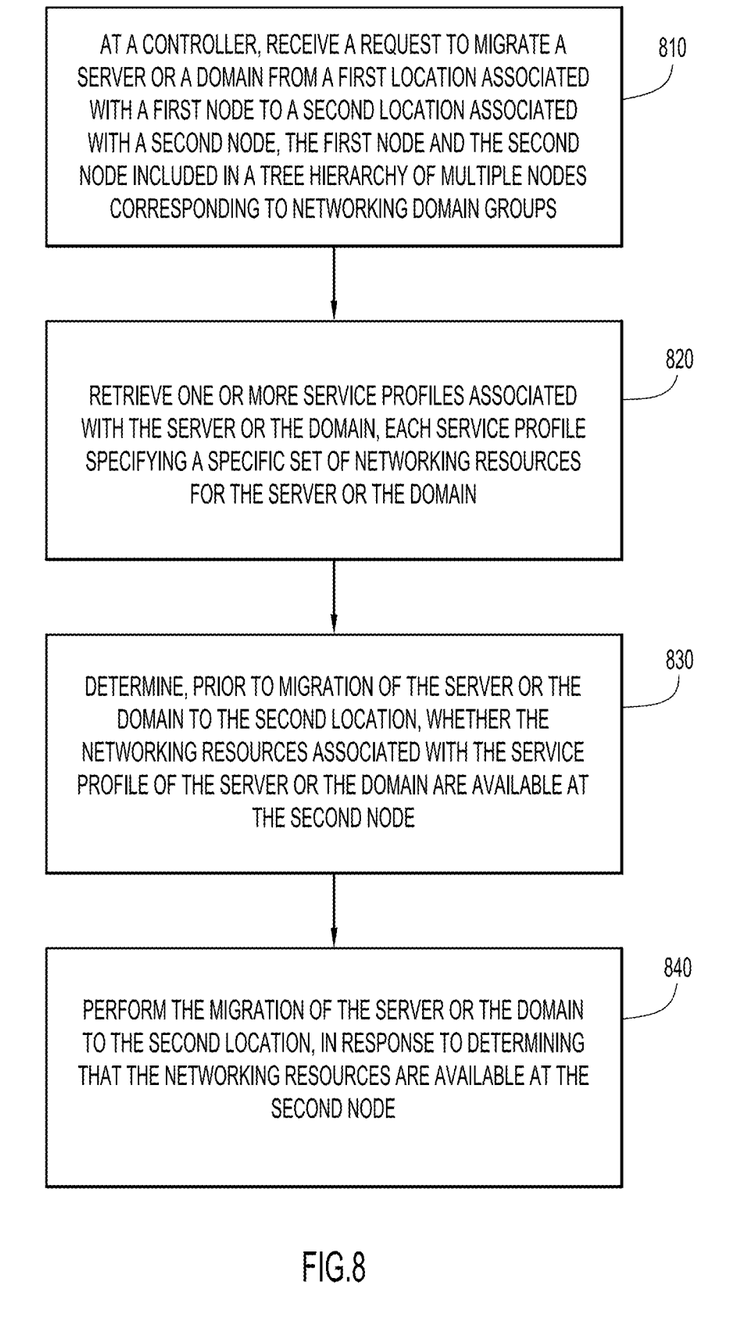
FIG. 8 illustrates a high level flowchart depicting a method according to an example embodiment.

FIG. 8 illustrates a high level flowchart depicting a method of networking resource resolution according to an example embodiment. At operation 810, at a controller, a request to migrate a server or a domain from a first location associated with a first node to a second location associated with a second node is received, the first node and the second node included in a tree hierarchy of multiple nodes corresponding to networking domain groups. At operation 820, one or more service profiles associated with the server or the domain are retrieved, each service profile specifying a specific set of networking resources for the server or the domain. At operation 830, prior to migration of the server or the domain to the second location, a determination is made as to whether the networking resources associated with the service profile of the server or the domain are available at the second node. At operation 840, the migration of the server or the domain to the second location is performed, in response to determining that the networking resources are available at the second node.

Figure 9:
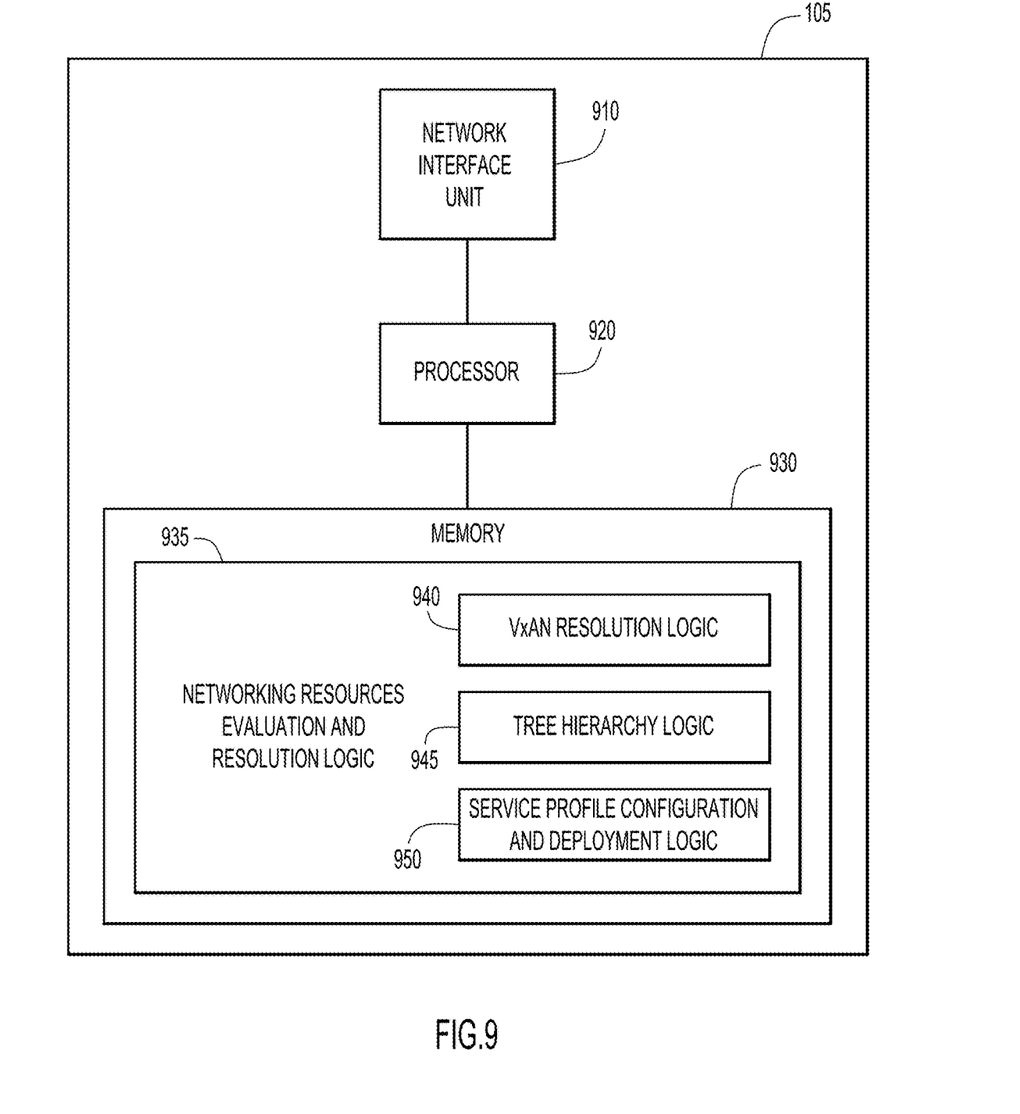
FIG. 9 shows a hardware configuration for a controller according to an example embodiment.

FIG. 9 illustrates an example block diagram of UCS central controller 105 configured to perform the techniques presented herein. The controller 105 includes a network interface unit 910, one or more processors 920, and a memory 930. The network interface unit 910 is configured to enable network communications over a network, e.g., network 112, to send and receive data (e.g., requests for migration, service profiles, variable information, etc.) with a UCS manager.

Networking resources evaluation and resolution logic 935 includes domain group tree hierarchy logic 945, service profile configuration and deployment logic 950, as well as VxAN resolution logic 940. Org hierarchy may also be stored in memory as well. Service profile configuration and deployment logic 950 sends and receives service profiles, as well as allows a user to set up and deploy a service profile. Tree hierarchy logic 945 includes the organization of various domain groups. VxAN resolution logic 940 allows requested resources, based on a service profile, to be evaluated at a particular location prior to migration, to determine the presence or absence of designated VLAN/VSAN resources.

The processor 920 may be embodied by one or more microprocessors or microcontrollers, and executes software instructions stored in memory to perform the functions described above in connection with FIGS. 1-8.

The memory 930 may comprise read only memory (ROM), random access memory (RAM), magnetic disk storage media devices, optical storage media devices, flash memory devices, electrical, optical, or other physical/tangible memory storage devices. Thus, in general, the memory 930 may comprise one or more tangible (non-transitory) computer readable storage media (e.g., a memory device) encoded with software comprising computer executable instructions and when the software is executed (by the controller) it is operable to perform the operations described herein.

Presented herein are techniques which allow for faster, more efficient workload deployments without physically binding a workload to a managed-endpoint. Unless a domain can carry the configuration, the migration will not occur, and therefore, an incompatible domain for deployment will not be selected. This results in improved user experience.

Having pre-validation of configuration from cloud-based management systems reduces traffic to valid configurations for managed-endpoints. This is distinct from existing solutions which can post a configuration to end-points using a public interface, in which requested resources of endpoints are not verified prior to migration. The techniques presented herein improve performance and simplicity as well as reduce administrator time from manual configurations for migrating workloads. As systems continue to grow, these techniques allow for more abstraction from location-based bindings.

Furthermore, these techniques may be useful for deploying global workloads on managed-domains without restricting the deployment to any physical domain, enabling customers to plan their workload deployments and maintenance activities very effectively. In addition, while the examples presented herein utilize flows moving up a tree hierarchy, other flows are encompassed by present techniques as well, e.g., beginning in the middle of a domain or near the top of a domain and moving down a tree hierarchy, selecting a node in another branch of a tree and moving up or down a tree hierarchy, etc.

The techniques presented herein provide a computer-implemented method, apparatus and computer readable media of resolving requested networking resources prior to server or domain migration. At a controller, a request to migrate a server or a domain from a first location associated with a first node to a second location associated with a second node is received, with the first node and the second node included in a tree hierarchy of multiple nodes corresponding to networking domain groups. One or more service profiles associated with the server or the domain is retrieved, each service profile specifying a specific set of networking resources for the server or the domain. Prior to migration of the server or the domain to the second location, it is determined whether the networking resources associated with the service profile of the server or the domain are available at the second node, and in response to determining that the networking resources are available at the second node, the migration of the server or the domain to the second location is performed.

Although the apparatus, system, and computer-implemented method are illustrated and described herein as embodied in one or more specific examples, it is nevertheless not intended to be limited to the details shown, since various modifications and structural changes may be made therein without departing from the scope of the apparatus, system, and computer-implemented method and within the scope and range of equivalents of the claims. Accordingly, it is appropriate that the appended claims be construed broadly and in a manner consistent with the scope of the apparatus, system, and computer-implemented method, as set forth in the following claims.

The above description is intended by way of example only. Various modifications and structural changes may be made therein without departing from the scope of the concepts described herein and within the scope and range of equivalents of the claims.

What is claimed is:

1. A method comprising:
   at a controller, receiving a request to migrate a server or a domain from a first location associated with a first node to a second location associated with a second node, the first node and the second node included in a tree hierarchy of multiple nodes corresponding to networking domain groups;
   retrieving one or more service profiles associated with the server or the domain, each service profile specifying a specific set of networking resources for the server or the domain;
   determining, prior to migration of the server or the domain to the second location, whether the networking resources associated with the service profile of the server or the domain are available at the second node;
   in response to determining that the networking resources are not available at the second node, determining whether a third node, adjacent to the first node in a branch of the tree hierarchy, is present;

evaluating whether the networking resources are available at the third node;

in response to determining that the networking resources are available at the third node, performing migration of the server or the domain; and updating, upon completion of migration of the server or the domain, a domain group hierarchy stored in the controller to reflect migration of the server or the domain.

2. The method of claim 1, comprising:

in response to determining that the networking resources are available at the second node, performing the migration of the server or the domain to the second location; and updating, upon completion of migration of the server or the domain to the second location, a domain group hierarchy stored in the controller to reflect the server or the domain migration.

3. The method of claim 1, comprising:

generating a message indicating that the migration has failed, when the third node is not present.

4. The method of claim 1, wherein the networking resources are specified in the storage profile and comprise specific compute resources associated with particular virtual local area networks and virtual storage area networks.

5. The method of claim 1, wherein the service profile comprises a server definition.

6. The method of claim 1, wherein the service profile comprises identity information.

7. The method of claim 1, wherein the service profile comprises one or more of a firmware revision specification or a connectivity definition.

8. An apparatus comprising:

a network interface unit configured to receive a request to migrate a server or a domain from a first location associated with a first node to a second location associated with a second node, the first node and the second node included in a tree hierarchy of multiple nodes corresponding to networking domain groups;

a processor coupled to the network interface unit and configured to:

retrieve one or more service profiles associated with the server or the domain, each service profile specifying a specific set of networking resources for the server or the domain;

determine, prior to migration of the server or the domain to the second location, whether the networking resources associated with the service profile of the server or the domain are available at the second node; and determine, in response to determining that the networking resources are not available at the second node, whether a third node, adjacent to the first node in a branch of the tree hierarchy, is present;

evaluate whether the networking resources are available at the third node;

perform migration of the server or the domain, in response to determining that the networking resources are available at the third node; and update, upon completion of migration of the server or the domain, a domain group hierarchy stored in the controller to reflect migration of the server or the domain.

9. The apparatus of claim 8, wherein the processor is further configured to:

perform the migration of the server or the domain to the second location, in response to determining that the networking resources are available at the second node; and update, upon completion of migration of the server or the domain to the second location, a domain group hierarchy stored in the controller to reflect the server or the domain migration.

10. The apparatus of claim 8, wherein the processor is further configured to:

generate a message indicating that the migration has failed, when the third node is not present.

11. The apparatus of claim 8, wherein the networking resources are specified in the storage profile and comprise specific compute resources associated with particular virtual local area networks and virtual storage area networks.

12. The apparatus of claim 8, wherein the service profile comprises a server definition.

13. The apparatus of claim 8, wherein the service profile comprises identity information.

14. The apparatus of claim 8, wherein the service profile comprises one or more of a firmware revision specification or a connectivity definition.

15. A non-transitory tangible computer readable storage media encoded with instructions that, when executed by a processor of a network device configured to perform networking resource resolution, cause the processor to:

receive, via a network interface unit, a request to migrate a server or a domain from a first location associated with a first node to a second location associated with a second node, the first node and the second node included in a tree hierarchy of multiple nodes corresponding to networking domain groups;

retrieve one or more service profiles associated with the server or the domain, each service profile specifying a specific set of networking resources for the server or the domain;

determine, prior to migration of the server or the domain to the second location, whether the networking resources associated with the service profile of the server or the domain are available at the second node; and determine, in response to determining that the networking resources are not available at the second node, whether a third node, adjacent to the first node in a branch of the tree hierarchy, is present;

evaluate whether the networking resources are available at the third node;

perform migration of the server or the domain, in response to determining that the networking resources are available at the third node; and update, upon completion of migration of the server or the domain, a domain group hierarchy stored in the controller to reflect migration of the server or the domain.

16. The computer readable storage media of claim 15, further comprising instructions to cause the processor to:

perform the migration of the server or the domain to the second location, in response to determining that the networking resources are available at the second node; and update, upon completion of migration of the server or the domain to the second location, a domain group hierarchy stored in the controller to reflect the server or the domain migration.

17. The computer readable storage media of claim 15, further comprising instructions to cause the processor to:

generate a message indicating that the migration has failed, when the third node is not present.

18. The computer readable storage media of claim 15, wherein the networking resources are specified in the storage profile and comprise specific compute resources associated with particular virtual local area networks and virtual storage area networks.

19. The computer readable storage media of claim 15, wherein the service profile comprises one or more of a server definition or identity information.

20. The computer readable storage media of claim 15, wherein the service profile comprises one or more of a firmware revision specification or a connectivity definition.

* * * * *